United States Patent
Goebel (10) Patent No.: US 6,289,505 B1
(45) Date of Patent: *Sep. 11, 2001

(54) METHOD, APPARATUS AND COMPUTER PROGRAMMED PRODUCT FOR BINARY RE-OPTIMIZATION USING A HIGH LEVEL LANGUAGE COMPILER

(75) Inventor: Kurt Joachim Goebel, Dayton, OH (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,668

(22) Filed: Nov. 18, 1997

(51) Int. Cl.$^7$ .......................................................... G06F 9/45
(52) U.S. Cl. ........................................ 717/9; 717/8; 717/11
(58) Field of Search .................................... 395/709, 707, 395/705; 717/8, 9, 11

(56) References Cited

U.S. PATENT DOCUMENTS

| | | | |
|---|---|---|---|
| 5,339,238 | * 8/1994 | Benson ................................ | 395/707 |
| 5,551,015 | * 8/1996 | Goettelmann et al. .............. | 395/707 |
| 5,560,013 | * 9/1996 | Scalzi et al. ......................... | 395/705 |
| 5,805,863 | * 9/1998 | Chang ................................... | 395/500 |
| 5,815,720 | * 9/1998 | Buzbee ................................. | 395/709 |
| 5,842,017 | * 11/1998 | Hookway et al. ................... | 395/707 |
| 5,854,924 | * 12/1998 | Rickel et al. ........................ | 395/704 |
| 5,881,290 | * 3/1999 | Ansari et al. ........................ | 395/705 |
| 5,903,760 | * 5/1999 | Farber et al. ........................ | 395/707 |
| 5,926,639 | * 7/1999 | Richardson .......................... | 395/707 |
| 5,930,509 | * 7/1999 | Yates et al. .......................... | 395/707 |
| 5,966,536 | * 10/1999 | Ravichandran ....................... | 395/709 |

OTHER PUBLICATIONS

Muller, H.; "Reverse Engineering Strategies for Software Migration"; Proceedings of the 1997 International Conference on Software Engineering; pp. 659–660, 1997.*

Cifuentes, C.; Malhotra, V.; "Binary Translation: Static, Dynamic, Retargetable?"; Proceedings of the 1996 International Conference on Software Maintenance; pp. 340–349, Nov. 1996.*

Cifuentes, C.; "Partial Automation of an Integrated Reverse Engineering Environment of Binary Code"; Proceedings of the Third Working Conference on Reverse Engineering; pp. 50–56, Nov. 1996.*

Cifuentes, C.; "An Environment for the Reverse Engineering of Executable Programs"; Proceedings of the 1995 Asia Pacific Software Engineering Conference; pp. 410–419, Dec. 1995.*

Feldman, Y.; Friedman, D.; "Portabiltity by Automatic Translation a Large–Scale Case Study"; Proceedings of the 10th Knowledge–Based Software Engineering Conference; pp. 123–130, Nov. 1995.*

(List continued on next page.)

Primary Examiner—Reba I. Elmore
(74) Attorney, Agent, or Firm—Beyer Weaver & Thomas, LLP (57) ABSTRACT

Apparatus, methods and computer program products are disclosed for a high level language compiler that includes a binary re-optimization capability. This re-optimization capability inputs a binary executable and outputs a binary module optimized for a target computer system. The binary module can be linked to create an optimized binary executable. This capability is provided by adding a front end segment to the compiler that reads the binary executable and creates an intermediate representation of the binary executable. This intermediate representation is normalized to remove prior optimization artifacts and to virtualize register usage. The intermediate representation is then optimized for a target computer system resulting in a binary module that can be linked to make a binary executable that is optimized for the target computer.

18 Claims, 7 Drawing Sheets

OTHER PUBLICATIONS

Andrews, K.; Sand, D.; "Migrating a CISC Computer Family onto a RISC via Object Code Translation"; ACM SIGPLAN Notices; vol. 27, No. 9, pp. 213–222, Sep. 1992.*

Cifuentes, C. and Gough, K.J., "Decompilation of Binary Programs," Ph.D. thesis from Department of Computer Science, University of Tasmania, GPO Box 252C, Hobart TAS 7001, Australia. Internet address: C.N. Cifuentes@cs.utas.edu.au. 1–31 (1994).

"Technical Introduction to Digital FX!32," Internet address: http://www.digital.it/prodserv/whitepap/fxwp.htm. 1–5 (1997).

Sites, R.L. et al., "Binary Translation," *Digital Technical Journal.* 04:(04) 1–16 (1992).

Srivastava, A. and Eustace A., "ATOM A System for Building Customized Program Analysis Tools," source of Digital Equipment Western Research Laboratory, 250 University Avenue, Palo Alto, CA 94301. Internet address: {amitabh, eustace}@decwrl.pa.dec.com. 196–205 (1994).

Wilson, L.S. et al., "Delivering Binary Object Modification Tools for Program Analysis and Optimization," *Digital Technical Journal.* 08:(01) 18–31 (1996).

* cited by examiner

METHOD, APPARATUS AND COMPUTER PROGRAMMED PRODUCT FOR BINARY RE-OPTIMIZATION USING A HIGH LEVEL LANGUAGE COMPILER

BACKGROUND OF THE INVENTION

Field of the Invention

This invention relates to the field of optimizing compilers. Specifically, this invention is a method, apparatus and computer program product for providing a high level language compiler with the capability to re-optimize a previously compiled binary executable.

Background

Figure 1:
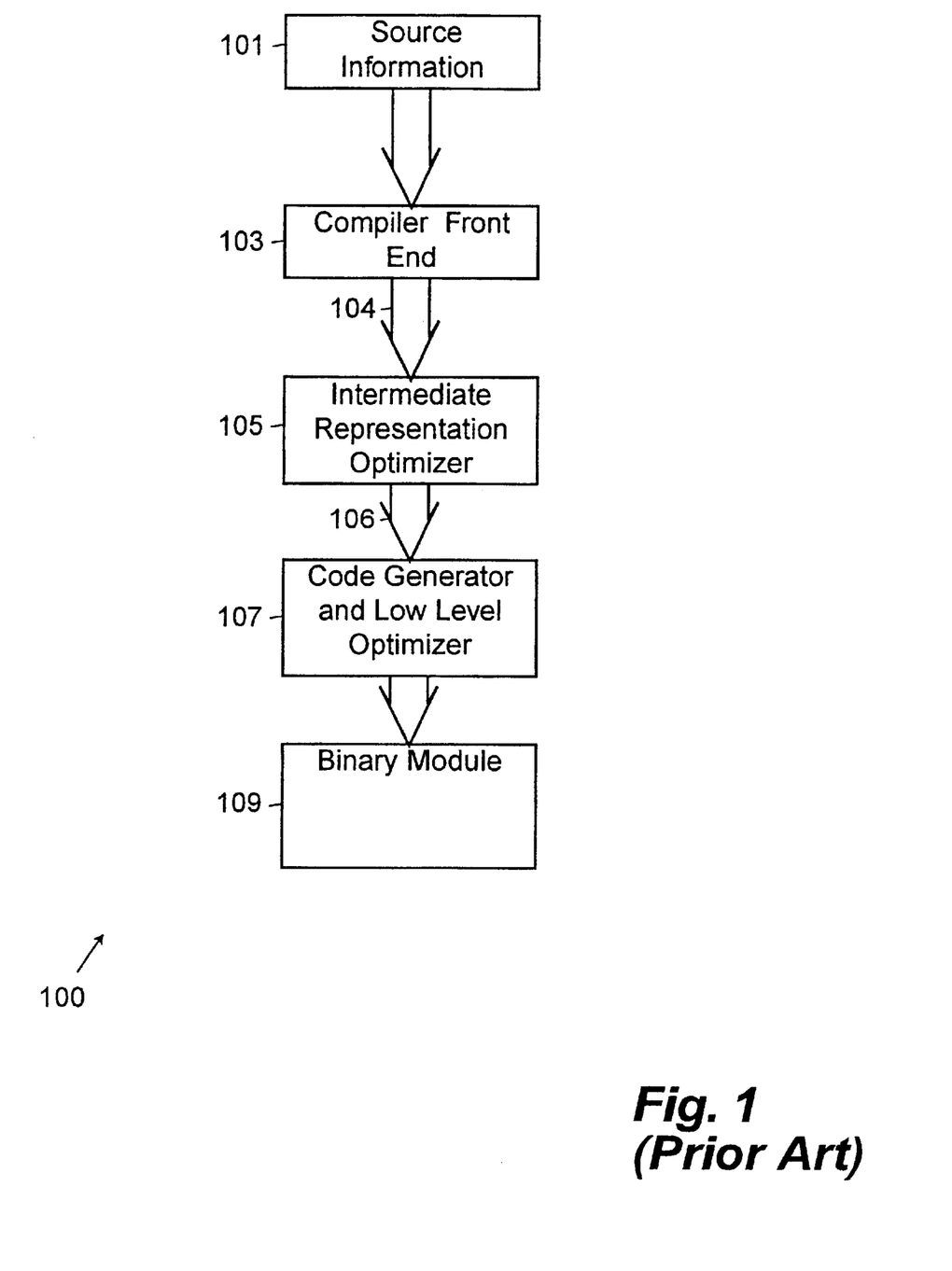
FIG. 1 illustrates a prior art compiler architecture.

FIG. 1 illustrates a prior art optimizing compiler, indicated by general reference character 100, for compiling a source program to create an optimized binary executable. The compiler 100 consumes source information 101 through a compiler front-end segment 103. The compiler front-end segment 103 processes the syntax and semantics of the source information 101 according to the rules of the programming language applicable to the source information 101. The compiler front-end segment 103 generates at least one version of an intermediate code representation 104 (IR) of the source information 101. The intermediate code representation generally includes data structures that either represent, or can be used to create, data dependency graphs (DDGs) and execution flow graphs. The intermediate code representation 104 is then optimized by an intermediate representation optimizer segment 105. The intermediate representation optimizer segment 105 operates on, and adjusts, the intermediate code representation 104 of the source information 101 to optimize the execution of a program in a variety of ways well understood in the art. The intermediate representation optimizer segment 105 generates an optimized intermediate representation 106. A code generator segment 107 consumes the optimized intermediate representation 106, performs low level optimizations, allocates physical registers and generates binary module 109 (and conditionally assembler source code) from the optimized intermediate representation 106. The binary module comprises binary computer instructions (binary code) in a module that can be linked with other modules to create a binary executable. The assembler source code is a series of symbolic statements in an assembler source language. Both the assembler source code and the binary code are targeted to a particular computer application binary interface (ABI).

DDGs embody the information required for an optimizer to determine which statements are dependent on other statements. The nodes in the graph represent statements in a programmed block and arcs represent the data dependencies between nodes. In particular, the scope of a variable extends from a "def" of the variable to a "use" of the variable. A "def" corresponds to an instruction that modifies a variable (an instruction "defines" a variable if the instruction writes into the variable). A use corresponds to an instruction that uses the contents of the variable. For example, the instruction "x=y+1;" "defs x" and "uses y". An arc in the DDG extends from the def of a variable to the use of the variable. DDGs are described in chapter 4 of *Supercompilers for Parallel and Vector Computers*, by Hans Zima, © 1991, ACM press, ISBN 0-201-17560-6, 1991.

As mentioned above, the code generator segment 107 performs low level optimizations and generates either (or both) binary code or assembler source code. The intermediate representation of the program generally references virtual registers. That is, the intermediate representation optimizer assumes that the target computer contains an unlimited number of registers. During the operation of the code generator segment 107, these virtual registers are assigned to the physical registers of the target computer. This resource management is performed in the code generator segment 107 by a register allocation (expansion) process.

One aspect of the register allocation process is that the contents of physical registers are often "spilled" to memory at various points during the execution of the program so that the limited number of physical registers can be used to hold values of more immediate relevance to the program at those various points. Those values that are spilled to memory are often restored to the registers when the program advances to different points of execution. An example of register allocation and register spilling techniques is provided in *Compilers: Principles, Techniques and Tools* by Alfred V. Aho, Ravi Sethi and Jeffrey D. Ullman, Addison-Wesley Publishing Co. © 1988, ISBN 0-201-10088-6, pages 541–546.

Execution flow graphs represent the sequence of operations executed by the program. Information can be included on the graph's edges to provide scheduling information such as dependency information, frequency of execution information or other information that is useful for optimizing the operations represented by the execution flow graph.

Software pipelining is a technique for scheduling the execution of instructions. In the cage of simple basic block loops, software pipelining schedules different overlapping iterations of the loop body to exploit a computer's underlying parallel computation units. The execution schedule includes of a prologue, a kernel, and an epilogue. The prologue initiates the first p iterations thus starting each iteration, A steady state is reached after the first p*II cycles, where II is the initiation interval where each initiated iteration is executing instructions in parallel. In this steady state or kernel, one iteration of the loop is completed every II cycles. Once the kernel initiates the last iteration in the loop, the epilogue completes the last p iterations of the loop that were initiated by the kernel. Often the instruction schedule requires that a particular instruction be initiated after some delay—thus, unfilled instruction slots in the instruction schedule are filled with "no-operation" (NOP) instructions.

Computer manufacturers often make a family of computers with similar architectures. One problem for both computer manufacturers and computer application developers is the conflict between the desire of computer manufacturers to provide more powerful computers with extended capabilities and that of the program application developers who tend to optimize an application to execute on the largest number of computers of a particular family. Although the models in the architecture family are similar, they often have differences. (For example, the SPARC™ architecture includes different application binary interfaces (ABIs), numbers of pipelines, and other differences between the V8, V8+, and V9 SPARC based models.) These differences are generally the result of cost/performance trade-offs or new architectural features added to later models. Commercial applications are generally compiled and optimized to execute using only the capabilities of the architecture that are shared by each model of the architecture family. Thus, the application does not use the advanced capabilities available to the more advanced models. Because application developers generally do not provide source code, the user of the application is unable to optimize the application to take advantage of the additional features of the more advanced models—thus, the application will not perform as efficiently as if it were optimized specifically for the computer model that executes the application.

Another problem is that compiler optimization generally assumes that each execution flow path is equally likely to be executed during the operation of the application. This means that the compiler does not optimize the execution flow path according to how the program actually operates. However, applications can be instrumented to capture an execution profile when operating on a particular data set. This profile information could be captured, and used to optimize an application specifically for use with that particular data set. In addition, some computer architectures provide memory performance information, such as cache-miss information for the memory caches. This information could also be used to optimize memory organization for a particular data set and usage pattern. These optimizations could include restructuring and rescheduling the code, using pre-fetch instructions and non-faulting loads, if the result of a branch instruction can be predicted, and other optimizations based on how the application performs when it executes. However, because application developers do not provide the application's source code for the user to compile, these optimizations are not available to the user of the application.

Yet another problem is that operating system facilities sometimes become obsolete. These obsolete services are usually retained and can be invoked by an obsolete operating system service invocation, but newer more efficient services are also provided. These newer services are invoked by preferred operating system service invocations. An application compiled to use the obsolete services cannot use the newer services.

Thus, it would be advantageous to provide a high level language compiler with the capability to re-optimize a binary executable, originally not optimized, partially optimized, or optimized for a particular computer system, so that the binary executable is optimized for another targeted computer system.

SUMMARY OF THE INVENTION

The present invention includes methods, apparatus and computer program products that re-optimize a binary executable for a target computer system. One aspect of the invention includes a computer controlled method for converting a first executable binary executable that executes within a first application binary interface (ABI) environment to a second binary executable that executes within a second ABI environment. The method is performed by a high level language compiler. The method includes the step of converting the first executable binary executable to an intermediate representation. Then the intermediate representation is processed to remove an architectural related optimization that depends on the first ABI environment. The method also includes the steps of optimizing the intermediate representation for the second ABI environment and of generating the second binary executable.

Another aspect of the invention includes an apparatus having a central processing unit (CPU) and a memory coupled to said CPU for converting, by a high level language compiler, a first executable binary executable, that executes within a first application binary interface (ABI) environment, to a second binary executable, that executes within a second ABI environment. The apparatus includes a binary dissasembler mechanism that is configured to convert the first executable binary executable to an intermediate representation. The intermediate representation, generated by the binary dissasembler mechanism, is processed by an intermediate representation normalization mechanism that is configured to remove an architectural related optimization that depends on the first ABI environment. The apparatus also includes an intermediate representation optimizer mechanism that is configured to optimize the intermediate representation for the second ABI environment. In addition, the apparatus includes a code generation mechanism that is configured to generate the second binary executable by using the intermediate representation that is optimized for the second ABI environment.

Another aspect of the invention is a computer program product that includes computer readable code, embedded in a computer usable storage medium, for causing a computer to convert, by a high level language compiler, a first executable binary executable, that executes within an first application binary interface (ABI) environment, to an second binary executable, that executes within an second ABI environment. When executed on a computer, the computer readable code causes a computer to effect a binary dissasembler mechanism, an intermediate representation normalization mechanism, an intermediate representation optimizer mechanism and a code generation mechanism. Each of these mechanisms have the same functions as the corresponding mechanisms for the previously described apparatus.

These and other features of the invention will become apparent when the following detailed description is read in combination with the accompanying figures.

DESCRIPTION OF THE PREFERRED EMBODIMENTS

Notations and Nomenclature

The following 'notations and nomenclature' are provided to assist in the understanding of the present invention and the preferred embodiments thereof Application Binary Interface (ABI)—The ABI is a binary standard that defines the opcodes and system services that are provided by a computer system and are available to an application program.

Architectural related optimization—An architectural related optimization is an optimization that depends on particular aspects of the architecture of the computer system that will execute a binary executable. Example architectural related optimizations include (without limitation) optimizations made that are dependent on the number of pipelines in the computer system, the number of available registers, memory cache structure, operating system services and other such facilities.

Binary executable—A binary executable is the data that is loaded into a computer's memory and that is executed by the computer's CPU.

Execution profile—An execution profile is a collection of data, gathered while a program executes, that reveals (without limitation) which procedures in the program are most frequently executed, the execution flow of the procedures, memory cache utilization, and other information that can be used to analyze the program's performance. The execution profile is often obtained by inserting instrumentation procedures within a binary executable.

Intermediate representation (IR)—The intermediate representation is the representation of a source program that results after the source program has been processed by a compiler's front-end segment The intermediate representation represents the structures and operations described in the source program but in a form that is efficiently processed in subsequent segments of the compiler.

Memory-cache performance information—The memory-cache performance information is information obtained from the computer's memory management system that provides information relating to which memory accesses generate cache misses. This information is used to optimize memory usage.

Pipeline scheduling artifact—A pipeline scheduling artifact is a specific architectural related optimization that effectuates a computer system's parallel processing capabilities. These artifacts include (without limitation) filling unused pipeline slots with NOP instructions, instructions used to effectuate a pipeline schedule, and other such optimizations Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing programmed instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

Operating Environment

Figure 2:
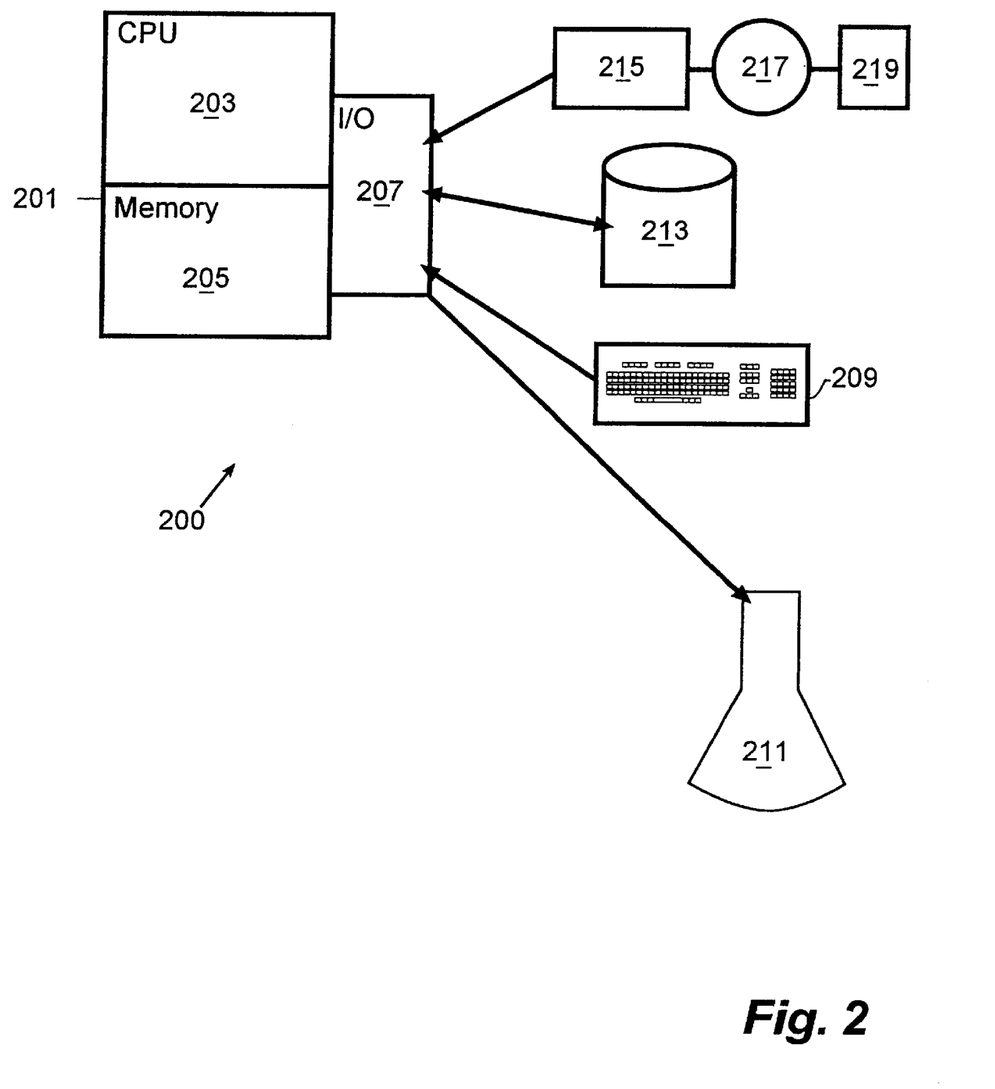
FIG. 2 illustrates a computer system capable of using the invention in accordance with a preferred embodiment.

Some of the elements of a computer system, as indicated by general reference character 200, configured to support the invention are shown in FIG. 2 wherein a processor 201 is shown, having a central processor unit (CPU) 203, a memory section 205 and an input/output (I/O) section 207. The I/O section 207 is connected to a keyboard 209, a display unit 211, a disk storage unit 213 and a CD-ROM drive unit 215. The CD-ROM drive unit 215 can read a CD-ROM medium 217 that typically contains a program and data 219. The CD-ROM drive unit 215, along with the CD-ROM medium 217, and the disk storage unit 213 comprise a filestorage mechanism. One skilled in the art will understand that the CD-ROM drive unit 215 can be replaced by a floppy disk, magnetic tape unit or similar device that accepts a removable media that can contain the program and data 219. Such a computer system is an example of a system that is capable of executing procedures that embody the invention.

Figure 3:
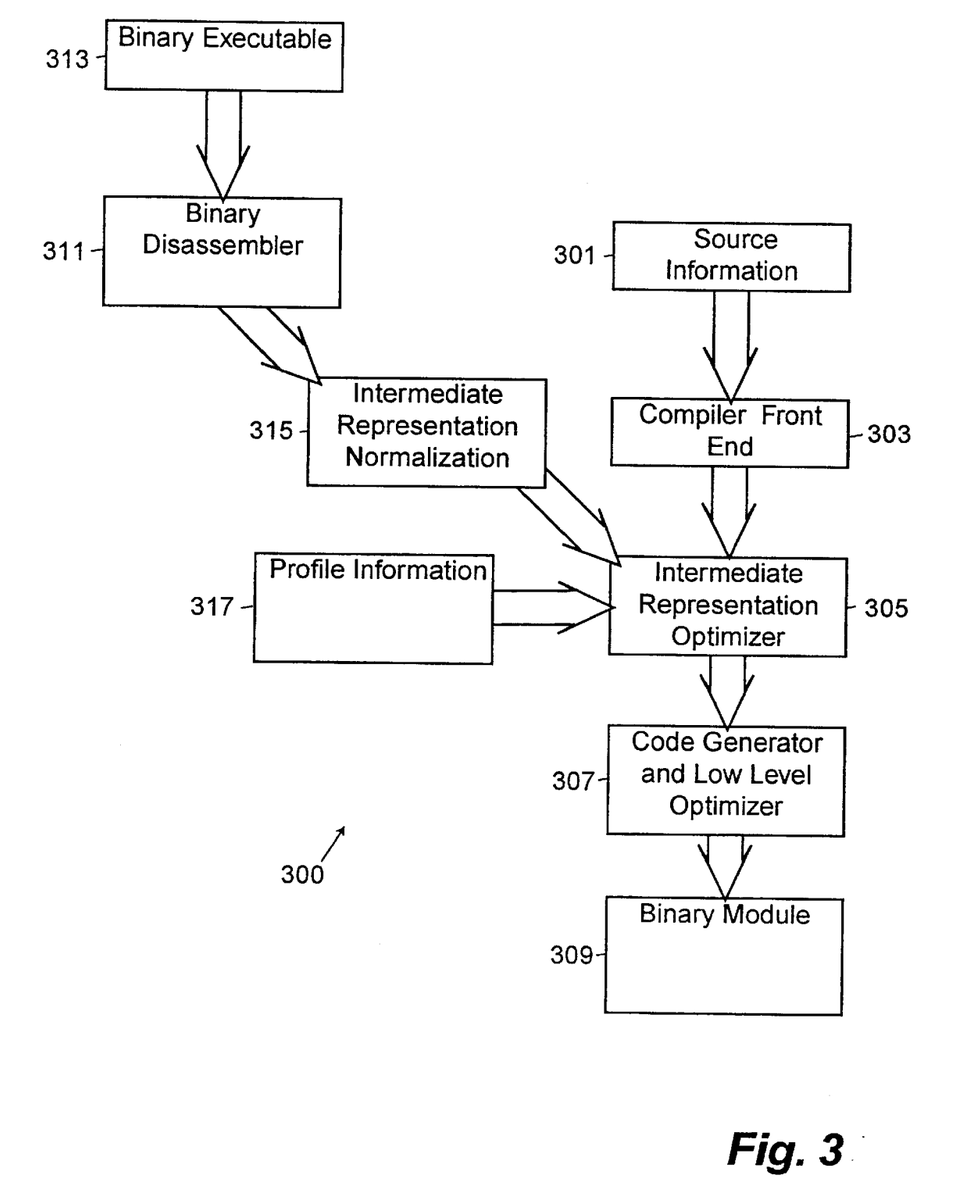
FIG. 3 illustrates a high level language re-optimizing compiler architecture in accordance with a preferred embodiment.

FIG. 3 illustrates a high level language re-optimizing compiler, indicated by general reference character 300, that is capable of re-optimizing a binary executable. Like the optimizing compiler 100 of FIG. 1, the re-optimizing compiler 300 can process source information 301 by a compiler front-end segment 303 that generates an intermediate representation of the source information 301. This intermediate representation is optimized by an intermediate representation optimizer segment 305 that performs optimizations on the intermediate representation. The optimized intermediate representation is then processed by a code generator segment 307 that generates a binary module 309 containing opcodes. A linker application converts the binary module 309 into a binary executable. The intermediate representation optimizer segment 305 and the code generator segment 307 also propagate portions of their internally collected symbol and alias information as annotations to the resulting binary module (and corresponding binary executable). This annotation information is used by a binary re-optimization process (subsequently described with respect to FIG. 4) to approximate the compiler's internal state during the compilation of the source code used to create the binary executable.

In addition to these components, the re-optimizing compiler 300 includes a binary dissasembler segment 311 that inputs and converts a binary executable 313 to an intermediate representation. The intermediate representation generated by the binary dissasembler segment 311 is then normalized by an IR normalization segment 315 that removes selected optimization artifacts from the IR. The operation of the IR normalization segment 315 is subsequently described with respect to FIG. 5. In effect the binary dissasembler segment 311 together with the IR normalization segment 315 perform the inverse operation of the operation performed by the code generator segment 307. Once the intermediate representation is normalized, it is used as input to the intermediate representation optimizer segment 305 where it is optimized and processed by the code generator segment 307 to make a binary module that can be linked by a linker to create a binary executable. The intermediate representation optimizer segment 305 of the re-optimizing compiler 300 can also process profile information 317 generated during execution of an instrumented binary executable to determine which portions of the binary executable most need to be optimized. One skilled in the art will understand that equivalent embodiments will combine the functionality of the binary dissasembler segment 311 and the IR normalization segment 315 into one component.

Figure 4:
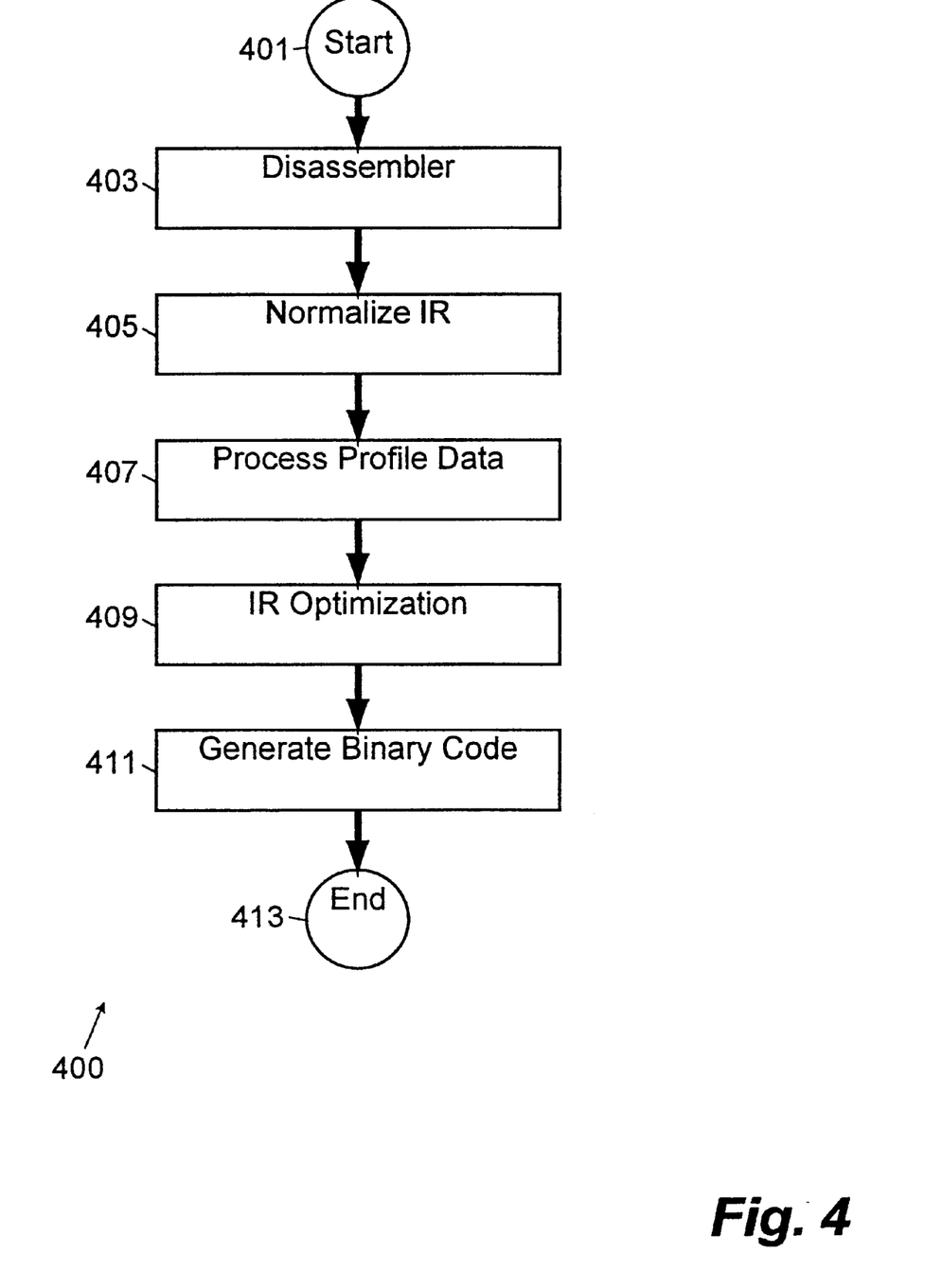
FIG. 4 illustrates a binary re-optimization process in accordance with a preferred embodiment.

FIG. 4 illustrates a binary re-optimization process, indicated by general reference character 400, used by the re-optimizing compiler 300 of FIG. 3 to re-optimize a binary executable. The binary re-optimization process 400 initiates at a 'start' terminal 401 and continues to a dissasembler procedure 403. The dissasembler procedure 403 inputs and converts the binary executable into a disassembled representation—an intermediate representation. The dissasembler procedure 403 also processes any supplied annotation information to approximate the compiler's state that was generated during the compilation of the source. In particular, the dissasembler procedure 403 uses the annotation information to recreate the program's symbol table and alias information from the original source compilation. Next, the intermediate representation is normalized by an 'IR normalization' procedure 405, as is subsequently described with respect to FIG. 5, to create an intermediate representation suitable for processing by the intermediate representation optimizer segment 305 of FIG. 3. Then the binary re-optimization process 400 conditionally (based on a user specified preference or option) inputs and processes execution profile data at a 'process profile data' procedure 407. This information, if provided, is used during an 'IR optimization' procedure 409. The 'IR optimization' procedure 409 optimizes the intermediate representation for the computer system (processor and operating system) that will execute the application. These optimizations include (without limitation) techniques for interprocedural optimization, and local, loop, and global scheduling. In addition, if profile data was processed during the 'process profile data' procedure 407, this data is used to optimize the application with respect to the data set and execution parameters used during the creation of the profile data. Once the intermediate representation is optimized, a 'binary code generation' procedure 411 performs low level optimizations (for example but without limitation, register allocation, delay slot filling, pipeline scheduling and peephole optimization) and generates a binary module suitable for linking. The binary re-optimization process 400 completes through an 'end' terminal 413. Optionally, the binary re-optimization process 400 can log information regarding the optimizations made on the original binary executable that result in the optimized binary executable. This information is used for debugging purposes to help locate problems that occur after several re-optimization iterations. One skilled in the art will understand that the placement of many of the optimizations above are a function of the compiler architecture and that application of the optimization techniques are often equivalent independent of their ordering.

Figure 5:
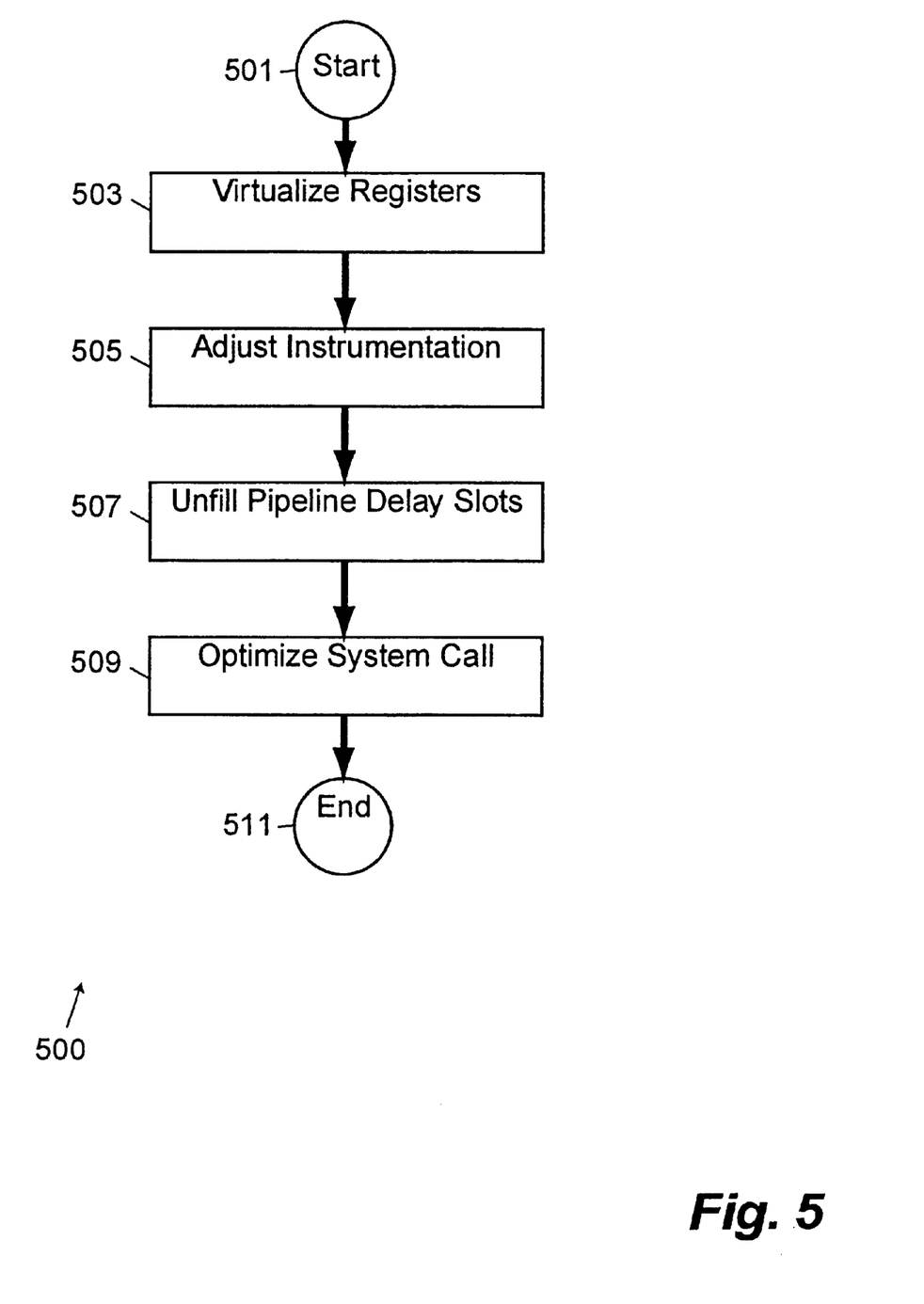
FIG. 5 illustrates an intermediate representation normalization process in accordance with a preferred embodiment.

FIG. 5 illustrates an IR normalization process, indicated by general reference character 500, used by the 'IR normalization' procedure 405 of FIG. 4. The IR normalization process 500 initiates at a 'start' terminal 501 and continues to a 'virtualize registers' procedure 503. The 'virtualize registers' procedure 503 virtualizies the registers to be independent of the register limitations of the original computer system and removes register spilling instructions from the intermediate representation. Next, an 'adjust instrumentation' procedure 505 conditionally removes, adds, or ignores profiling instructions in the intermediate representation. These profiling instructions are used to gather and save profile data relating to the execution history and/or the memory cache performance of the executing program. That is, when the binary executable is executed by the computer, the profiling procedures measure relevant characterisics of the executing program and store this information as profile data. The profile data from a particular execution is used (either alone or in combination with other profile data) by the 'process profile data' procedure 407 to re-optimize the binary executable based on the execution profile. Next, an 'unfill pipeline delay slots' procedure 507 detects filled pipeline delay slots and promotes the instructions used to fill the slot out of the schedule. The freed slots may be filled with NOP instructions or the schedule may be collapsed. The 'unfill pipeline delay slots' procedure 507 may also include additional mechanisms to detect and remove other pipeline scheduling artifacts from the intermediate representation. Finally, an 'optimize system call' procedure 509 conditionally (dependent on a user profile or command option) replaces obsolete operating system service invocations with preferred operating system service invocations. The IR normalization process 500 completes through an 'end' terminal 511.

Figure 6:
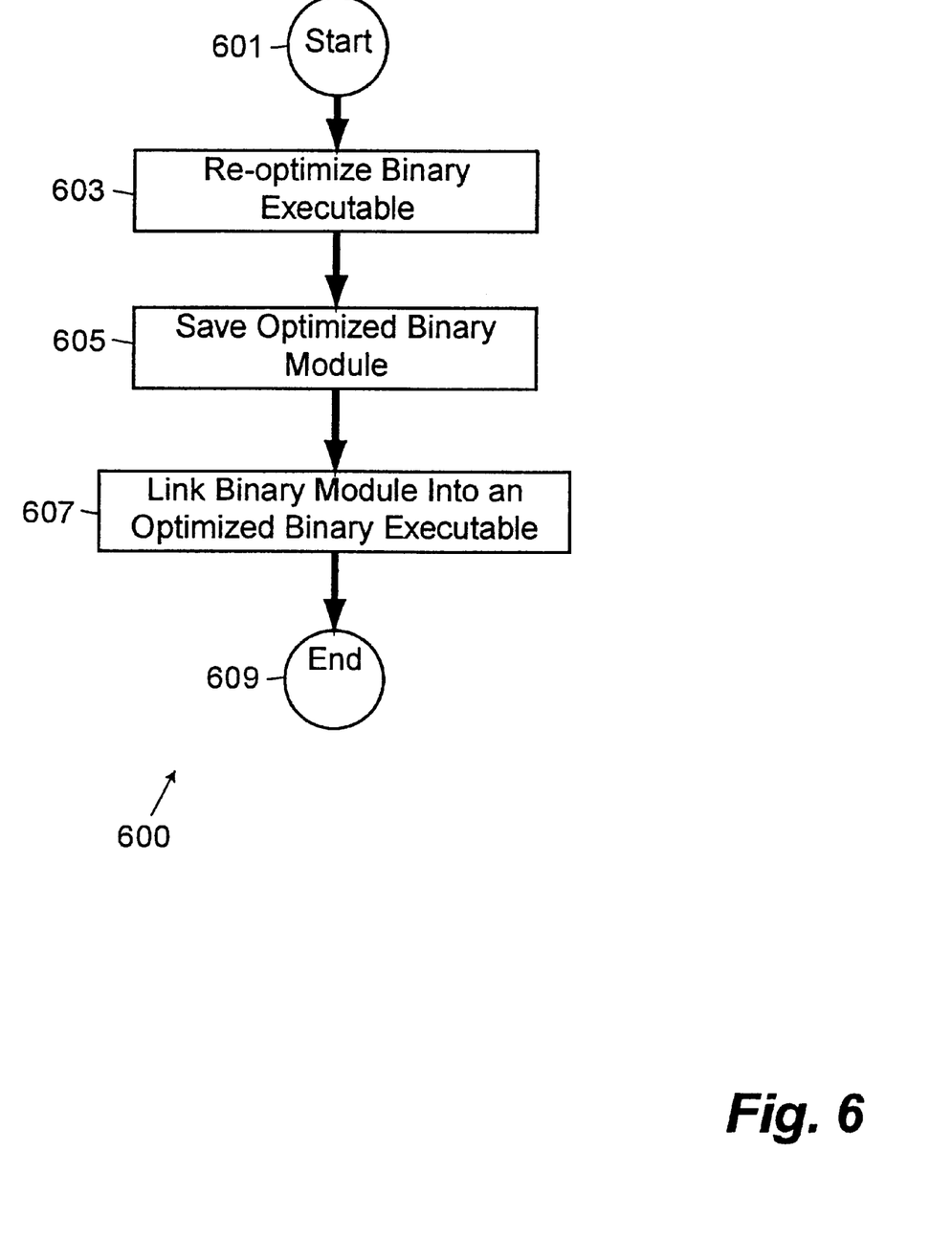
FIG. 6 illustrates a binary executable update process in accordance with a preferred embodiment.

One skilled in the art will understand that the previously described techniques will optimize or re-optimize a binary executable that was either not optimized, or optimized for a different computer system (CPU and/or operating system) than the computer system targeted by the compilation. Thus, such a historical binary executable, that is not optimized for the computer system executing it, can be optimized to use the available features provided by that specific computer system executing the binary executable. FIG. 6 illustrates a re-optimization process, as indicated by general reference character 600, that re-optimizes a historical binary executable initially targeted for a particular computer system. The re-optimization process 600 initiates at a 'start' terminal 601 and continues to a 're-optimize binary executable' procedure 603 that uses the previously described techniques to generate an optimized binary module based on the binary executable. Next, a 'save optimized binary module' procedure 605 saves the optimized binary generated by the 're-optimize binary executable' procedure 603. This saved module is then processed by a linker application (or its equivalent) to generate an optimized binary executable by a 'link binary module' procedure 607. The re-optimization process 600 completes through an 'end' terminal 609.

Figure 7:
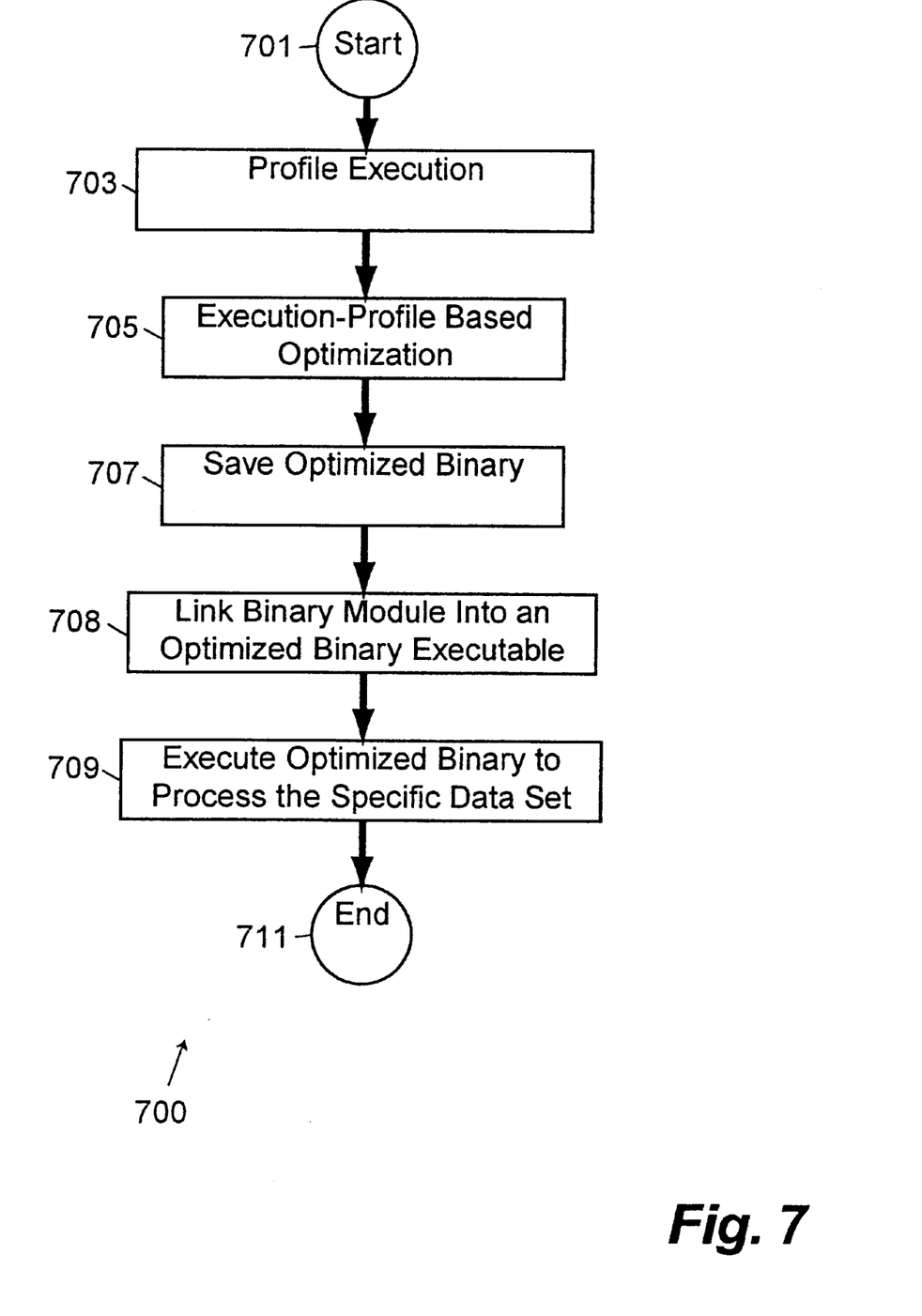
FIG. 7 illustrates a profiled re-optimization process in accordance with a preferred embodiment.

FIG. 7 illustrates a profile-based re-optimization process, indicated by general reference character 700, used to re-optimize a binary executable with respect to its processing of a particular data set. The process 700 initiates at a 'start' terminal 701 and continues to a 'profile execution' procedure 703. The 'profile execution' procedure 703 executes an instrumented version of the binary executable on a specific data set. The instrumentation in the binary executable includes (without limitation) procedures that capture the program's execution history, processor and memory cache performance information, and other information that one skilled in the art will understand can be used to optimize execution of the binary executable. An 'execution profile based optimization' procedure 705 analyzes the profile information generated by the 'profile execution' procedure 703 to optimize the binary executable with respect to that particular data set. The 'execution profile based optimization' procedure 705 also conditionally removes, adds or optimizes the instrumentation procedures on the binary executable as desired by the user. Next, a 'save optimized binary module' procedure 707 saves the newly optimized binary module. This saved module is then processed by a linker application (or its equivalent) to generate an optimized binary executable at a 'link binary module' procedure 708. An 'execute save data set specific binary executable on dataset' procedure 709 then executes the optimized binary executable on the data set to achieve the optimized performance with respect to that data set. Finally, the process 700 completes through an 'end' terminal 711.

One skilled in the art will understand that the previously described techniques will optimize a binary executable for use with a particular data set. Further, one skilled in the art will also understand that one can perform multiple optimizations on a binary executable to generate multiple binaries each optimized for use with a particular data set. An additional capability allows the user to combine profiles from multiple data sets of interest or from multiple uses of a given data set to optimize the binary executable for those specific data sets of interest.

From the foregoing, it will be appreciated that the invention has (without limitation) the following advantages:

1) The invention optimizes the binary executable for the target computer that will execute the binary executable without using the binary executable's source code. Thus, the invention enables more efficient operation of the binary executable on the target computer.

2) The invention enables a computer user to optimize the binary executable dependent on the data set processed by the binary executable.

3) The invention allows a binary executable to use new operating system services instead of older services when appropriate.

4) The invention allows an application developer to provide an unoptimized binary executable of an application and for the developer's customers to optimize the application for their own specific computers.

5) The invention only requires one implementation of compiler optimization code for both source code optimized compilation and binary code re-optimization.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for converting a first binary executable that executes within a first application binary interface (ABI) environment to a second binary executable that executes within a second ABI environment, said method performed by a high level language compiler and comprising:

converting said first binary executable to an intermediate representation;

approximating the state of the compiler used to compile the first binary executable at least partially based on annotation information;

removing from the intermediate representation an architectural related optimization that depends on said first ABI environment based upon the approximating of the state of the compiler used to compile the first binary executable, wherein said removing removes register availability limitations from within said intermediate representation;

optimizing said intermediate representation for said second ABI environment, at least partially based on an execution profile; and generating said second binary executable based on the optimizing of said intermediate representation.

2. The computer controlled method of claim 1 wherein step (b) further comprises steps of:

(b1) detecting a pipeline scheduling artifact within said intermediate representation; and (b2) removing said pipeline scheduling artifact from said intermediate representation.

3. The computer controlled method of claim 1 wherein said first ABI environment is substantially identical to said second ABI environment and step (c) further comprises:

(c1) analyzing an execution profile resulting from execution of said first executable binary executable; and (c2) optimizing said intermediate representation dependent on said execution profile.

4. The computer controlled method of claim 1 wherein said first ABI environment is substantially identical to said second ABI environment and step (c) further comprises:

(c1) analyzing an execution profile to determine memory-cache performance information; and (c2) optimizing said intermediate representation dependent on said memory-cache performance information to improve performance.

5. The computer controlled method of claim 1 wherein said architectural related optimization is a first operating system service invocation and step (c) further comprises replacing said first operating system service invocation with a preferred operating system service invocation.

6. The computer controlled method of claim 5 wherein said first operating system service invocation is an obsolete operating system service invocation.

7. An apparatus having a central processing unit (CPU) and a memory coupled to said CPU for converting, by a high level language compiler, a first binary executable that executes within a first application binary interface (ABI) environment to a second binary executable that executes within a second ABI environment, said apparatus comprises:

a binary disassembler mechanism configured to convert said first executable binary executable to an intermediate representation;

a compiler approximation mechanism configured to approximate the state of the compiler used to create said first binary executable, at least partially based on annotation information;

an intermediate representation normalization mechanism configured to remove an architectural related optimization from the first binary executable based on the approximation by the compiler approximation mechanism, wherein said intermediate representation normalization mechanism further comprises a register virtualization mechanism configured to remove register availability limitations from within said intermediate representation;

an intermediate representation optimizer mechanism configured to optimize said intermediate representation for said second ABI environment, at least partially based on an execution profile; and a code generation mechanism configured to generate said second binary executable using said intermediate representation, said intermediate representation optimized for said second ABI environment.

8. The apparatus of claim 7 wherein the intermediate representation normalization mechanism further comprises:

a pipeline scheduling detection mechanism configured to detect a pipeline scheduling artifact within said intermediate representation; and a pipeline artifact removal mechanism configured to remove said pipeline scheduling artifact, detected by the pipeline scheduling detection mechanism, from said intermediate representation.

9. The apparatus of claim 7 wherein said first ABI environment is substantially identical to said second ABI environment and the intermediate representation optimizer mechanism further comprises:
an execution analysis mechanism configured to analyze an execution profile resulting from execution of said first executable binary executable; and
an execution-profile optimization mechanism configured to optimize said intermediate representation dependent on said execution profile analyzed by the execution analysis mechanism.

10. The apparatus of claim 7 wherein said first ABI environment is substantially identical to said second ABI environment and has at least one memory cache mechanism and the intermediate representation optimizer mechanism further comprises:
a cache analysis mechanism configured to analyze an execution profile to determine memory-cache performance information; and
a cache optimization mechanism configured to optimize said intermediate representation dependent on said memory-cache performance information to improve performance of said at least one memory cache mechanism.

11. The apparatus of claim 7 wherein said architectural related optimization is a first operating system service invocation and the intermediate representation optimizer mechanism further comprises an operating system invocation replacement mechanism configured to replace said first operating system service invocation with a preferred operating system service invocation.

12. The apparatus of claim 11 wherein said first operating system service invocation is an obsolete operating system service invocation.

13. A computer program product comprising:
a computer usable storage medium having computer readable code embodied therein for causing a computer to convert, by a high level language compiler, a first binary executable that executes within a first application binary interface (ABI) environment to a second binary executable that executes within a second ABI environment, said computer readable code comprising:
computer readable program code configured to cause said computer to effect a binary disassembler mechanism configured to convert said first binary executable to an intermediate representation;
computer readable program code configured to cause said computer to approximate the state of the compiler used to compile said first binary executable, at least partially based on annotation information;
computer readable program code configured to cause said computer to effect an intermediate representation normalization mechanism configured to remove an architectural related optimization based on the approximation of the state of the compiler used to compile the first binary executable;
computer readable program code configured to cause said computer to effect an intermediate representation optimizer mechanism configured to optimize said intermediate representation for said second ABI environment, at least partially based on an execution profile;
computer readable program code configured to cause said computer to effect a code generation mechanism configured to generate said second binary executable using said intermediate representation optimized for said second ABI environment; and
wherein the intermediate representation normalization mechanism comprises computer readable program code configured to cause said computer to effect a register virtualization mechanism configured to remove register availability limitations from within said intermediate representation.

14. The computer program product of claim 13 wherein the intermediate representation normalization mechanism further comprises:
computer readable program code configured to cause said computer to effect a pipeline scheduling detection mechanism configured to detect a pipeline scheduling artifact within said intermediate representation; and
computer readable program code configured to cause said computer to effect a pipeline artifact removal mechanism configured to remove said pipeline scheduling artifact, detected by the pipeline scheduling detection mechanism, from said intermediate representation.

15. The computer program product of claim 13 wherein said first ABI environment is substantially identical to said second ABI environment and the intermediate representation optimizer mechanism further comprises:
computer readable program code configured to cause said computer to effect an execution analysis mechanism configured to analyze an execution profile resulting from execution of said first executable binary executable; and
computer readable program code configured to cause said computer to effect an execution-profile optimization mechanism configured to optimize said intermediate representation dependent on said execution profile analyzed by the execution analysis mechanism.

16. The computer program product of claim 13 wherein said first ABI environment is substantially identical to said second ABI environment and has at least one memory cache mechanism and the intermediate representation optimizer mechanism further comprises:
computer readable program code configured to cause said computer to effect a cache analysis mechanism configured to analyze an execution profile to determine memory-cache performance information; and
computer readable program code configured to cause said computer to effect a cache optimization mechanism configured to optimize said intermediate representation dependent on said memory-cache performance information to improve performance of said at least one memory cache mechanism.

17. The computer program product of claim 13 wherein said architectural related optimization is a first operating system service invocation and the intermediate representation optimizer mechanism further comprises computer readable program code configured to cause said computer to effect an operating system invocation replacement mechanism configured to replace said first operating system service invocation with a preferred operating system service invocation.

18. The computer program product of claim 17 wherein said first operating system service invocation is an obsolete operating system service invocation.

* * * * *